(12) United States Patent
Moosmann

(10) Patent No.: US 9,098,074 B2
(45) Date of Patent: Aug. 4, 2015

(54) SAFETY-RELATED CONTROL UNIT AND METHOD FOR CONTROLLING AN AUTOMATED INSTALLATION

(75) Inventor: Peter Moosmann, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 855 days.

(21) Appl. No.: 13/276,909

(22) Filed: Oct. 19, 2011

(65) Prior Publication Data
US 2012/0095573 A1    Apr. 19, 2012

Related U.S. Application Data

(63) Continuation of application No. PCT/EP2010/002436, filed on Apr. 20, 2010.

(30) Foreign Application Priority Data

Apr. 20, 2009    (DE) .......................... 10 2009 019 087

(51) Int. Cl.
    *G05B 19/18*    (2006.01)
    *G06F 11/00*    (2006.01)
    (Continued)

(52) U.S. Cl.
    CPC ................ *G05B 9/03* (2013.01); *G05B 19/058* (2013.01); *G05B 2219/14006* (2013.01);
    (Continued)

(58) Field of Classification Search
    CPC .................. G05B 9/03; G05B 19/058; G05B 2219/24188; G05B 2219/24024; G05B 2219/14012; G05B 2219/14006; G05B 20/188311; G06F 11/1417; G06F 1/1076
    USPC .......................................... 714/11–13; 700/7
    See application file for complete search history.

(56) References Cited

U.S. PATENT DOCUMENTS 3,751,684 A * 8/1973 Struger ........................... 326/14
4,193,120 A * 3/1980 Yello ............................... 700/16
(Continued)

FOREIGN PATENT DOCUMENTS

CN    1353834 A    6/2002
DE    198 02 728 A1    7/1999
(Continued)

OTHER PUBLICATIONS

EN 954-1; Safety-related parts of control systems; Mar. 1997; 34 pages.
(Continued)

*Primary Examiner* — Robert Fennema
*Assistant Examiner* — Thomas Stevens
(74) *Attorney, Agent, or Firm* — Harness, Dickey & Pierce, P.L.C.

(57) ABSTRACT

A safety-related control unit for controlling an automated installation in accordance with an application program containing control instructions. The safety-related control unit has first and second processors for executing at least some of the control instructions by processing a plurality of first and second program variables, respectively. The first processor also determines a first test value for at least one of the first program variables in accordance with an instantaneous value present for this first program variable at a first defined instance of time. The second processor determines a second test value for the at least one of the first program variables. The second test value corresponds to the first test value. The safety-related control unit also has a data memory for storing the instantaneous value, the first test value and the second test value in order to facilitate a quick restart of the control unit after an unexpected interrupt.

13 Claims, 3 Drawing Sheets

(51) Int. Cl.
   *G05B 9/03* (2006.01)
   *G05B 19/05* (2006.01)
   *G06F 11/14* (2006.01)
   *G06F 11/10* (2006.01)

(52) U.S. Cl.
   CPC ........... *G05B 2219/14012* (2013.01); *G05B 2219/24024* (2013.01); *G05B 2219/24188* (2013.01); *G06F 11/1076* (2013.01); *G06F 11/1417* (2013.01)

(56) References Cited

U.S. PATENT DOCUMENTS

| | | | |
|---|---|---|---|
| 4,787,041 A | 11/1988 | Yount | |
| 5,414,836 A * | 5/1995 | Baer et al. | 714/38.1 |
| 5,937,149 A * | 8/1999 | Lindner et al. | 358/1.14 |
| 6,549,827 B1 * | 4/2003 | Yen | 700/282 |
| 6,618,637 B1 | 9/2003 | Kerner | |
| 6,643,555 B1 * | 11/2003 | Eller et al. | 700/83 |
| 6,647,301 B1 * | 11/2003 | Sederlund et al. | 700/79 |
| 6,745,107 B1 * | 6/2004 | Miller | 700/282 |
| 6,777,830 B1 * | 8/2004 | Anderson et al. | 307/326 |
| 6,862,553 B2 * | 3/2005 | Schwenke et al. | 702/183 |
| 6,957,115 B1 * | 10/2005 | Meyer-Grafe et al. | 700/108 |
| 7,266,476 B2 * | 9/2007 | Coburn et al. | 702/183 |
| 7,286,895 B2 * | 10/2007 | Krieg | 700/177 |
| 7,453,677 B2 * | 11/2008 | Bucella et al. | 361/62 |
| 7,599,752 B2 * | 10/2009 | Chen | 700/41 |
| 7,610,119 B2 | 10/2009 | Abe et al. | |
| 8,099,672 B2 * | 1/2012 | Van Dyk et al. | 715/762 |
| 8,335,573 B2 | 12/2012 | Buettner et al. | |
| 2002/0082725 A1 * | 6/2002 | Dute et al. | 700/51 |
| 2003/0154920 A1 * | 8/2003 | Charpin | 118/696 |
| 2004/0008467 A1 * | 1/2004 | Calandre et al. | 361/119 |
| 2005/0010332 A1 | 1/2005 | Abe et al. | |
| 2005/0060606 A1 * | 3/2005 | Kalan et al. | 714/12 |
| 2005/0137721 A1 * | 6/2005 | Attarwala | 700/30 |
| 2005/0188351 A1 * | 8/2005 | Hoefler et al. | 717/106 |
| 2006/0224811 A1 * | 10/2006 | Sichner et al. | 710/306 |
| 2007/0019641 A1 * | 1/2007 | Pai et al. | 370/389 |
| 2007/0035255 A1 * | 2/2007 | Shuster et al. | 315/2 R |
| 2007/0124115 A1 | 5/2007 | Buttner et al. | |
| 2007/0168077 A1 * | 7/2007 | Schuster | 700/170 |
| 2007/0271002 A1 * | 11/2007 | Hoskinson et al. | 700/245 |
| 2008/0155318 A1 * | 6/2008 | Shelvik et al. | 714/12 |
| 2008/0208374 A1 * | 8/2008 | Grgic et al. | 700/83 |
| 2010/0063792 A1 * | 3/2010 | Noetzelmann et al. | 703/13 |
| 2010/0192686 A1 * | 8/2010 | Kamen et al. | 73/29 R |
| 2010/0286797 A1 * | 11/2010 | Liu et al. | 700/21 |
| 2010/0306601 A1 | 12/2010 | Kranz et al. | |

FOREIGN PATENT DOCUMENTS

| | | |
|---|---|---|
| DE | 20 2006 016 012 U1 | 1/2007 |
| DE | 10 2007 045 398 A1 | 4/2009 |
| GB | 2 313 678 A | 12/1997 |
| JP | 7-295602 | 11/1995 |
| JP | 9-319401 | 12/1997 |
| JP | 2007-533045 A | 11/2007 |

OTHER PUBLICATIONS

EN ISO 13849-1; Safety of machinery—Safety-related parts of control systems—Part 1: General principles for design (ISO 13849-1:2006); Nov. 2006; 96 pages.

CEI IEC 61508-2; Functional safety of electrical/electronic/programmable electronic safety-related systems-Part 2: Requirements for electrical/electronic/programmable elecronic safety-related systems; May 2000; 150 pages.

* cited by examiner

US 9,098,074 B2

SAFETY-RELATED CONTROL UNIT AND METHOD FOR CONTROLLING AN AUTOMATED INSTALLATION

CROSS REFERENCES TO RELATED APPLICATIONS

This application is a continuation of international patent application PCT/EP2010/002436 filed on Apr. 20, 2010 designating the U.S., which international patent application has been published in German language and claims priority from German patent application DE 10 2009 019 087.2 filed on Apr. 20, 2009. The entire contents of these priority applications are incorporated herein by reference.

BACKGROUND OF THE INVENTION

The present invention relates to a safety-related control unit for controlling an automated installation in accordance with an application program, with the installation comprising a plurality of sensors and a plurality of actuators, and the application program comprising a plurality of control instructions for controlling the actuators in response to signals from the sensors. The invention also relates to a method for controlling such an automated installation.

A safety-related control unit in terms of the present invention is an apparatus or a device which receives input signals delivered by sensors and generates output signals from these input signals by logical combinations and possibly other signal or data processing steps. The output signals can then be supplied to actuators which effect actions or reactions in a controlled installation on the basis of the input signals.

A preferred field of application for such safety-related control units is the monitoring of emergency-off buttons, two-hand controllers, protective doors or light grids in the field of machine safety. Such sensors are used in order to safeguard, for example, a machine which, in operation, entails a risk for persons or material goods. When the protective door is opened or when the emergency-off button is operated, a respective signal is generated and supplied as input signal to the safety-related control unit. In response thereto, the safety-related control unit then switches off the hazardous part of the machine with the aid of an actuator, for example.

In contrast to a "normal" control unit, it is characteristic of a safety-related control unit that the safety-related control unit always ensures a safe state of the hazardous installations or machines even if a malfunction occurs in it or an apparatus connected to it. For this reason, extremely high demands are made on their own failsafety in the case of safety-related control units, which results in a considerable expenditure in the development and production.

As a rule, safety-related control units need a special approval from a competent supervisory authority such as, for example, from the professional associations or what is called TUV in Germany. In this context, the safety-related control unit must meet predetermined safety standards which are defined, for example, in European Standard EN 954-1, IEC 61508 or EN ISO 13849-1 or a comparable standard. In the text which follows, a safety-related control unit is understood to be an apparatus or a device which meets at least the safety category 3 of the European Standard EN 954-1, or Safety Integrity Level (SIL) 2 in accordance with the IEC 61508.

A programmable safety-related control unit offers the user the possibility to individually define the logical combinations and possibly further signal or data processing steps using a piece of software, the so-called application program, in accordance with his requirements. This results in great flexibility in comparison with earlier solutions in which the logical combinations were generated by a defined hardwiring between various safety-related modules. An application program can be generated, for example, with the aid of a commercially available personal computer (PC) and by using appropriate software programs.

As already mentioned, extremely high demands in terms of failsafety are put on a safety-related control unit. One approach is, for example, to design a safety-related control unit redundantly at least in the data-processing components such as, for example, the processors. This achieves the greatest possible availability of the safety-related control unit with a view to faults occurring in the safety-related control unit. Similarly, high availability of a safety-related control unit is desirable with a view to faults possibly occurring outside the safety-related control unit. For example, after the voltage failure a safety-related control unit should be operated again without problems in the state assumed by the safety-related control unit before a voltage failure occurred. But it is especially with regard to the availability in the case of faults occurring outside the safety-related control unit that safety-related control units are not yet optimal.

SUMMARY OF THE INVENTION

It is an object of the present invention, therefore, to provide a safety-related control unit and a method of the type initially mentioned in order to increase the availability of safety-related control units with respect to faults occurring outside the safety-related control unit, and to reduce the costs for a safety-related control unit at the same time.

In view of this object, there is provided a safety-related control unit for controlling an automated installation in accordance with an application program executed on the control unit, the installation comprising a plurality of sensors and a plurality of actuators, and the application program comprising a plurality of control instructions for controlling the actuators, the safety-related control unit comprising a first processor designed for executing at least some of the control instructions by processing a plurality of first program variables, the first processor also being designed for determining a first test value for at least one of the first program variables in dependence on an instantaneous value present for this first program variable at a first defined instance of time, comprising a second processor designed for executing at least some of the control instructions by processing a plurality of second program variables, the second processor further being designed for determining a second test value for the at least one of the first program variables, said second test value corresponding to the first test value, and comprising a data memory designed for storing the instantaneous value, the first test value and the second test value.

There is also provided a method for controlling an automated installation, the installation comprising a plurality of sensors and a plurality of actuators, the method comprising the steps of processing a plurality of first program variables using a first processor; determining a first test value for at least one of the first program variables in dependence on an instantaneous value present for this first program variable at a first defined instance of time; processing a plurality of second program variables using a second processor; determining a second test value for the at least one of the first program variables, said second test value corresponding to the first test value; storing the instantaneous value, the first test value and the second test value in a data memory in order to provide the instantaneous value for a start up, and in order to check a validity of the instantaneous value at the start up using the first and second test values.

The novel safety-related control unit and the novel method are based on the concept of storing in a data memory an instantaneous value for a program variable and both a first test value which is determined by means of a first processor and thus for a first channel of the safety-related control unit, and a second test value which is determined by means of a second processor and thus for a second channel. Thus, the validity of the instantaneous value stored can be redundantly checked in both channels in the case of a restart, for example after an unexpected interruption in the operating sequence. This increases the availability of the safety-related control unit. Since both test values are stored in one data memory, it is sufficient to provide a data memory for only one of the two channels. It is not required to provide a separate data memory for each of the two channels. This reduces the costs for the implementation of a safety-related control unit.

In a refinement of the invention, the second processor is also designed for determining the second test value in dependence on an instantaneous value of one of the second program variables, the second program variable corresponding to the first program variable.

In some variants of this refinement, the first and second program variables are mutually redundant program variables which represent a common instantaneous value of the controlled installation. This refinement has several advantages. On the one hand, the two test values are determined individually and thus independently of one another. As a result, the checking, whether the stored instantaneous value is valid or not, becomes more reliable. In addition, a separate test value is available for each of the two channels. Thus, an individual validity test and plausibility check of the stored instantaneous value can be carried out for both channels. This redundancy increases the availability of the safety-related control unit and thus of the installation to be controlled.

In a further refinement, the instantaneous value of the first program variable and the instantaneous value of the second program variable originate from the same task cycle.

As a rule, the processors execute their respective control program cyclically, each processor reading its program variables cyclically. In this embodiment, the first and second program variables originate from a common cycle. They therefore represent two instantaneous values largely present at the same instance of time. This refinement ensures that the two instantaneous values correspond to one another in time. They are therefore more comparable and it is sufficient to store only one instantaneous value for a validity test. This enables the data memory to be dimensioned cost effectively. The task cycle is advantageously defined by the first defined instance of time.

In a further refinement, the safety-related control unit is designed for determining the two test values in different manner.

This refinement contributes to increasing the reliability of a validity test. For the two channels of a safety-related control unit, different algorithms are preferably used for determining the respective test value.

In a further refinement, the data memory is designed as a non-volatile data memory.

This refinement ensures that the stored instantaneous value and the two stored test values are available immediately with a restart of the safety-related control unit, especially after an unexpected interruption. The installation can be taken into operation again more rapidly. The data memory is designed preferably as a so-called Magneto-resistive Random Access Memory (MRAM) or else a Ferroelectric Random Access Memory (FRAM).

In a further refinement, the safety-related control unit is designed for determining the two test values repeatedly for successive instances of time.

This refinement ensures that the stored instantaneous values are updated repeatedly. The updating preferably occurs at regular time intervals. The refinement advantageously allows to restart the installation with rather up-to-date values. A restart of the installation can therefore take place more simply and more quickly.

In a further refinement, the first processor is also designed for performing an instantaneous-value comparison.

In this refinement, the first processor compares instantaneous values from different instances of time. This refinement provides for an optimized storage of the current instantaneous value and of the two test values. The instantaneous-value comparison is performed in order to find out whether there is a change in the instantaneous value compared with a preceding instantaneous value already stored. If it is found that there is no change, the current instantaneous value and the two current test values are not stored again. In other words, storing advantageously occurs only when there is actually a change. As a result, a smaller data memory can be used which leads to a cost saving. With regard to the operation of the safety-related control unit, this refinement contributes to an optimization in expenditure. This is because this refinement leads to an instantaneous value and associated test values not being stored for each task cycle.

In a further refinement, the safety-related control unit is designed for performing a validity check of the instantaneous value on a restart and checking the plausibility of the instantaneous value with the first test value by means of the first processor and checking the plausibility of the instantaneous value with the second test value by means of the second processor.

This refinement has the advantage that a validity test can be carried out for the two channels of a safety-related control unit using only one instantaneous value which, in addition, is determined for only one of the two channels. As a result, for example, the expenditure for storing the instantaneous value can be reduced. It is thus sufficient to provide a single data memory only. This data memory is preferably allocated to the channel of the safety-related control unit where both safety-related program variables and non-safety-related program variables are processed.

In a further refinement, the data memory comprises two storage areas allocated to the first program variable.

This refinement makes it possible to store a recent instantaneous value and the two respectively associated test values for two different instances of time and thus two different task cycles. Thus, a history of the instantaneous value over at least two different task cycles is preferably stored in the storage areas. This further increases the availability of the installation to be controlled in the case of a restart. If it is found during the validity test that the most current instantaneous value stored last is not valid and thus cannot be used for initializing the safety-related control unit, there is still a previously stored older instantaneous value available which can be advantageously used for the restart.

In a further refinement, the safety-related control unit is designed for storing the instantaneous value and the two test values alternately into the two storage areas.

This refinement uses two storage areas in order to update the history of the instantaneous value alternatingly. The refinement keeps a most current instantaneous value (from the current task cycle Z) ready in one storage area and an older instantaneous value (from the preceding task cycle Z−1) ready in the other storage area at any instance of time. If a current instantaneous value is then read in in the next task cycle Z+1, this refinement overwrites the oldest stored instantaneous value in each case. This refinement ensures that the two most recent generations of the instantaneous values are always stored with a minimum of memory requirement in operation of the safety-related control unit and are thus available for an initialization of the safety-related control unit after an interruption.

In a further refinement, at least one of the two processors is designed for determining a value for a write counter.

The write counter advantageously represents which of the two aforementioned storage areas contains the most recent instantaneous value in each case. With this refinement, it is easier to determine which one of these instantaneous values is the youngest and is thus the first one to be subjected to a validity check in the case where a number of instantaneous values present at different instances of time are stored in the data memory. Each of the two processors preferably determines its own write counter. This further increases the availability of the safety-related control unit.

In a further refinement, the first processor is also designed for determining the first test value in dependence on the instantaneous value and the value of the write counter.

In this refinement, the first processor takes into consideration not only the instantaneous value but also the write counter value in the determination of the check sum. The first test value is preferably determined as follows: the instantaneous value and the value of the write counter are stored in two storage cells of a storage area. The first test value is then determined via the values in the two storage cells. The embodiment has the advantage that the test value secures both the instantaneous value and its currency which further increases the reliability of the information in the case of a restart of the installation.

In a further refinement, the first and the second program variables each are safety-related program variables.

This refinement ensures that in the case of a restart and an associated initialization, the values of the program variables needed in the safety-related control unit for processing the safety control instructions are available. This ensures the operational reliability of the installation from the restart. However, it is also possible to store instantaneous values of non-safety-related program variables in the data memory.

The data which must be available in the case of a restart of the safety-related control unit and thus must be stored in the data memory are generally called zero-voltage-proof data. As already stated, zero-voltage-proof data are essentially safety-related data. These can be instantaneous values of safety-related program input variables, instantaneous values of safety-related program output variables or instantaneous values of safety-related intermediate program variables. In brief, they can be data which occur during the execution of safety-related control instructions. However, they can also be non-safety-related data which occur during the execution of non-safety-related control instructions, that is to say instantaneous values of non-safety-related program input variables, instantaneous values of non-safety-related program output variables or instantaneous values of non-safety-related intermediate program variables. Non-safety-related data can also be of significance for starting up a installation. As an example, a non-safety-related counter variable will be mentioned, the instantaneous value of which represents the number of chairs of a chair lift which are no longer located on the lift cable but already in a storage depot.

The first processor can preferably be designed for determining a first test value in each case for an arbitrary number of first program variables. Correspondingly, the second processor can be designed for determining a corresponding second test value for each of the first test values.

Naturally, the aforementioned features and those still to be explained in the text which follows can be used not only in the combination specified in each case but also in other combinations or by themselves without departing from the scope of the present invention.

BRIEF DESCRIPTION OF THE DRAWINGS

Exemplary embodiments of the invention are shown in the drawing and will be explained in greater detail in the description following. In the drawing.

DESCRIPTION OF PREFERRED EMBODIMENTS

Figure 1:
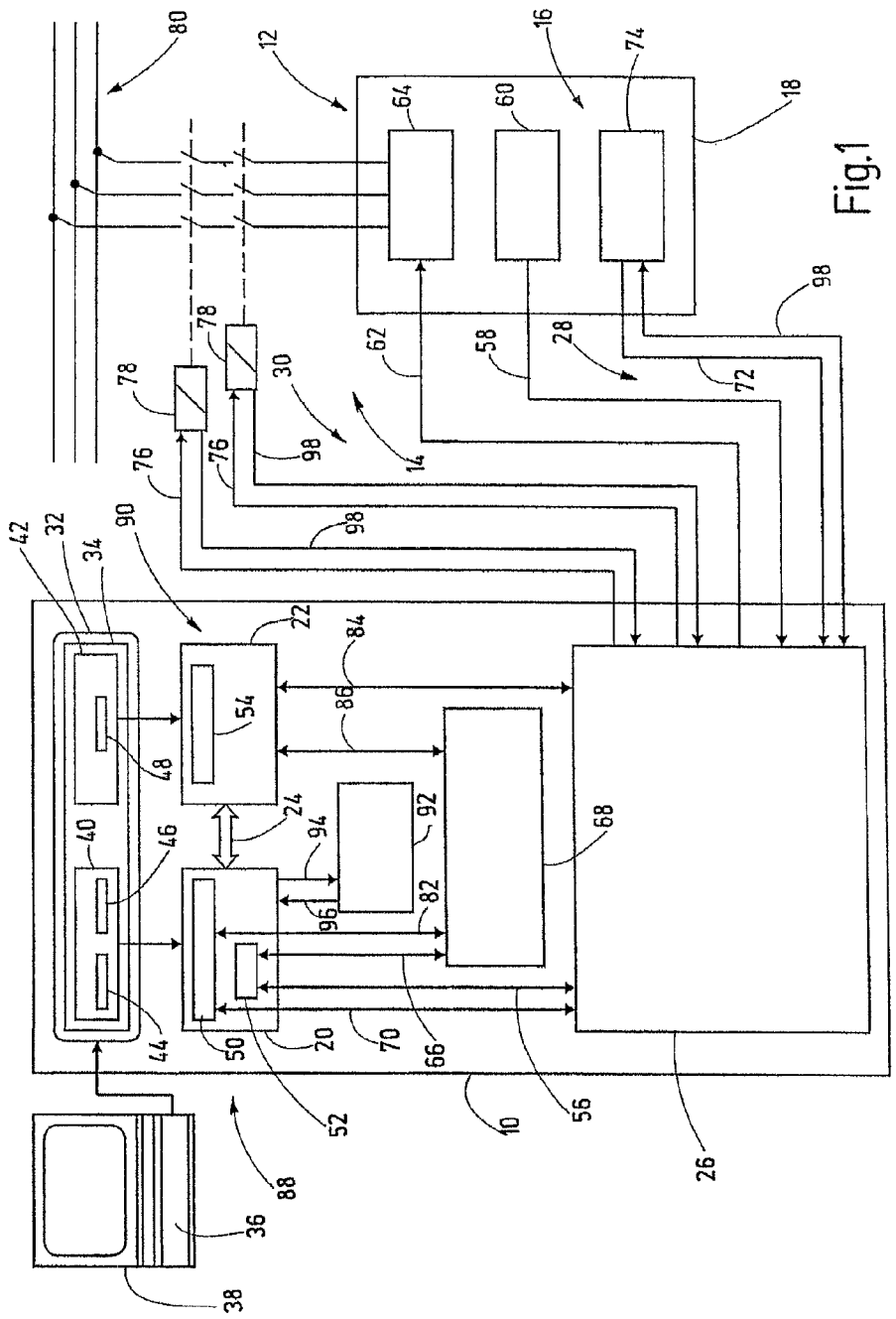
FIG. 1 shows a diagrammatic representation of a installation to be controlled.

In FIG. 1, a safety-related control unit is designated by reference number 10. The safety-related control unit 10 is designed for controlling an automated installation designated by reference number 12 in its totality. The installation 12 comprises a plurality of actuators 14 and a plurality of sensors 16. By way of an example, a load 18 contained in the installation 12 is shown which can be, for example, a robot.

The safety-related control unit 10 is constructed to be two-channel-redundant in order to enable the required failsafety for controlling safety-critical applications or processes. Representative of the two-channel structure, two separate processors, namely a first processor 20 and a second processor 22, are shown in FIG. 1. The two processors 20, 22 are connected to one another via a bidirectional communication interface 24 in order to be able to monitor each other and exchange data. Preferably, the two channels of the safety-related control unit 10 and the two processors 20, 22 are constructed to be diversitary, i.e. different from one another, in order to largely eliminate systematic failures.

An input/output unit connected to each of the two processors 20, 22 is designated by reference number 26. The input/output unit 26 receives control input signals 28 from the sensors 16 and forwards these to each of the two processors 20, 22 in an appropriate data format. Furthermore, the input/output unit 26 generates, in dependence on the processors 20, 22, control output signals 30 with which the actuators 14 are driven.

The reference number 32 designates a program memory in which an application program 34 is stored in the form of machine code. The application program 34 is executed by the safety-related control unit 10. The application program 34 is created in its entirety with the aid of a programming tool, a source code first being created which is then converted into a machine code. The programming tool is, for example, a computer program 36 which can be executed on a conventional PC 38. The program memory 32 is preferably constructed as an SD card or as a CF card. This provides for a simple exchange of the application program 34 even without direct connection to the PC 38. As an alternative, the application program 34 can also be stored in a memory permanently installed in the safety-related control unit 10, for example an EEPROM. In any case, the program memory 32 is constructed to be zero-voltage-proof.

To provide for failsafe processing of safety-related program variables, a first machine code 40 and a second machine code 42 are stored in the program memory 32. The first machine code 40 is intended for the first processor 20 and the second machine code 42 is intended for the second processor 22. The first machine code 40 comprises a first safety code 44 and a standard code 46. The first safety code 44 comprises the safety control instructions which are to be executed by the first processor 20 as part of the safety tasks to be handled by the safety-related control unit 10. The standard code 46 comprises the standard control instructions which are to be executed by the first processor 20 as part of the standard tasks to be handled by the safety-related control unit 10. The second machine code 42 comprises a second safety code 48 which comprises the safety control instructions which are to be executed by the second processor 22. The safety control instructions and standard control instructions are here called control instructions in summary.

Depending on the progress of processing, a first current safety control instruction 50, on the one hand, and a current standard control instruction 52, on the other hand, are executed in the first processor 20. At essentially the same time, a second current safety control instruction 54 is executed in the second processor 22.

As part of the processing of the current standard control instruction 52, which is a non-safety-related control instruction, first non-safety-related data 56 are exchanged between the first processor 20 and the input/output unit 26. In this process, instantaneous values of non-safety-related control input signals 58, which are generated by non-safety-related sensors 60, are supplied to the first processor 20 by using non-safety-related program input variables. The non-safety-related sensors 60 are sensors, the signals of which are primarily of significance for the operational sequence of the installation but which do not represent any immediate hazard to life and limb in the case of a fault. For example, non-safety-related sensors detect the position of a tool for machining a workpiece. As a rule, the non-safety-related sensors 60 are constructed to be nonfailsafe. The input/output unit 26 is supplied with instantaneous values of non-safety-related control output signals 62, which are supplied to non-safety-related actuators 64 as drive signals, using non-safety-related program output variables. The non-safety-related actuators 64 can be, for example, motors or positioning cylinders. The instantaneous values of the non-safety-related control output signals 62 are determined in accordance with the standard control instructions in dependence on the non-safety-related control input signals 58. This may require intermediate quantities to be determined, the instantaneous values of which are assigned to non-safety-related intermediate program variables. The instantaneous values of the non-safety-related intermediate program variables are supplied by means of second non-safety-related data 66 to a main memory 68 where they are temporarily stored.

As part of the processing of the first current safety control instruction 50, which is a safety-related control instruction, first safety-related data 70 are exchanged between the first processor 20 and the input/output unit 26. In this process, instantaneous values of safety-related control input signals 72, which are generated by safety-related sensors 74, are supplied to the first processor 20 by using safety-related program input variables. The safety-related sensors 74 are, for example, emergency-off buttons, protective door switches, light grids, rotational speed monitoring devices or other sensors for recording safety-related parameters. The input/output unit 26 is supplied with instantaneous values of safety-related control output signals 76, which are supplied to safety-related actuators 78 as drive signals, using safety-related program output variables. The safety-related actuators 78 are, for example, circuit breakers, the normally open contacts of which are arranged in the connection between a power supply 80 and the load 18, safety-related magnetic valves or other actuators by means of which a hazardous drive can be reliably stopped. Thus, the power supply 80 of the load 18 can be switched off as a result of which it is possible at least to bring the load 18 into a safe state with the occurrence of a corresponding malfunction. The instantaneous values of the safety-related control output signals 76 are determined in accordance with the safety control instructions in dependence on the safety-related control input signals 72. In this context, it may be necessary to determine safety-related intermediate quantities, the instantaneous values of which are assigned to safety-related intermediate program variables. The instantaneous values of the safety-related intermediate program variables are supplied by means of second safety-related data 82 to the main memory 68 where they are temporarily stored.

As part of the processing of the second current safety control instruction 54, which is a safety-related control instruction, the procedure follows the first current safety control instruction 50. With respect to the second current safety control instruction 54, third safety-related data 84, which correspond to the first safety-related data 70, and fourth safety-related data 86, which correspond to the second safety-related data 82, are used correspondingly.

The first processor 20 is thus designed for executing at least some of the control instructions of the application program by logically combining a plurality of first program variables. The first processor 20 is part of a first channel 88 which is designated as channel A. The second processor 22 is thus designed for executing at least some of the control instructions of the application program by processing a plurality of second program variables. The second processor 22 is part of a second channel 90 which is called channel B.

There is a data memory 92 in the safety-related control unit 10 for storing zero-voltage-proof data. These zero-voltage-proof data are those data which must be present, for example, when the safety-related control unit 10 is switched on after a voltage failure, and thus during the startup of the installation 12 to be controlled. This data memory is designed as a non-volatile data memory. The data memory 92 is allocated to the first processor 20, that is to say the processor which processes both safety control instructions and standard control instructions. This has the advantage that safety-related data and non-safety-related data, which are processed by the first processor 20, can be stored in the data memory 92 in a simple manner. Safety-related data which are to be processed in the second processor 22 and stored in the data memory 92 are supplied to the first processor 20 via the bidirectional communication interface 24 in order to be written into the data memory 92. In a correspondingly reverse procedure, data stored in the data memory 92 are returned to the second processor 22. Allocating the data memory 92 to the first processor 20 is not intended to have a restrictive effect. It is also conceivable to allocate the data memory 92 to the second processor 22. Similarly, it is conceivable that both processors 20, 22 can access the data memory 92 directly.

The writing-in of data into the data memory 92 is represented by an arrow 94 and the reading-out of data from the data memory 92 is represented by an arrow 96. Which data will actually be written into the data memory 92 and thus stored in it will be explained in conjunction with FIGS. 2 and 3.

Test signals 98 are exchanged between the safety-related control unit 10 and the safety-related sensors 74 and the safety-related actuators 78 via the input/output unit 26. With the aid of the test signals 98, it is possible to determine in the safety-related control unit 10 whether the components connected to it are operating faultlessly which is required since a safe state of the installation 12 to be controlled must be guaranteed as soon as a malfunction occurs on an apparatus connected to the safety-related control unit 10.

The above statements, according to which instantaneous values are generated for the safety-related control output signals 76 both by the first processor 20 and the second processor 22, do not mean that the instantaneous values generated by these two processors 20, 22 are output at the same time as control output signals 76. The above statements are only intended to reproduce the structure of the safety-related control unit 10 which is redundant with respect to the safety tasks to be handled. Both processors 20, 22 are designed for determining instantaneous values for the safety-related control output signals 76. During the faultless operation of the safety-related control unit 10, only the values determined by a processor, for example the first processor 20, are output. The representation chosen in FIG. 2, according to which both non-safety-related control instructions and safety-related control instructions are processed in the safety-related control unit 10, is not intended to have a restrictive effect. It is also feasible that the safety-related control unit 10 is designed for the exclusive processing of safety-related control instructions.

Figure 2:
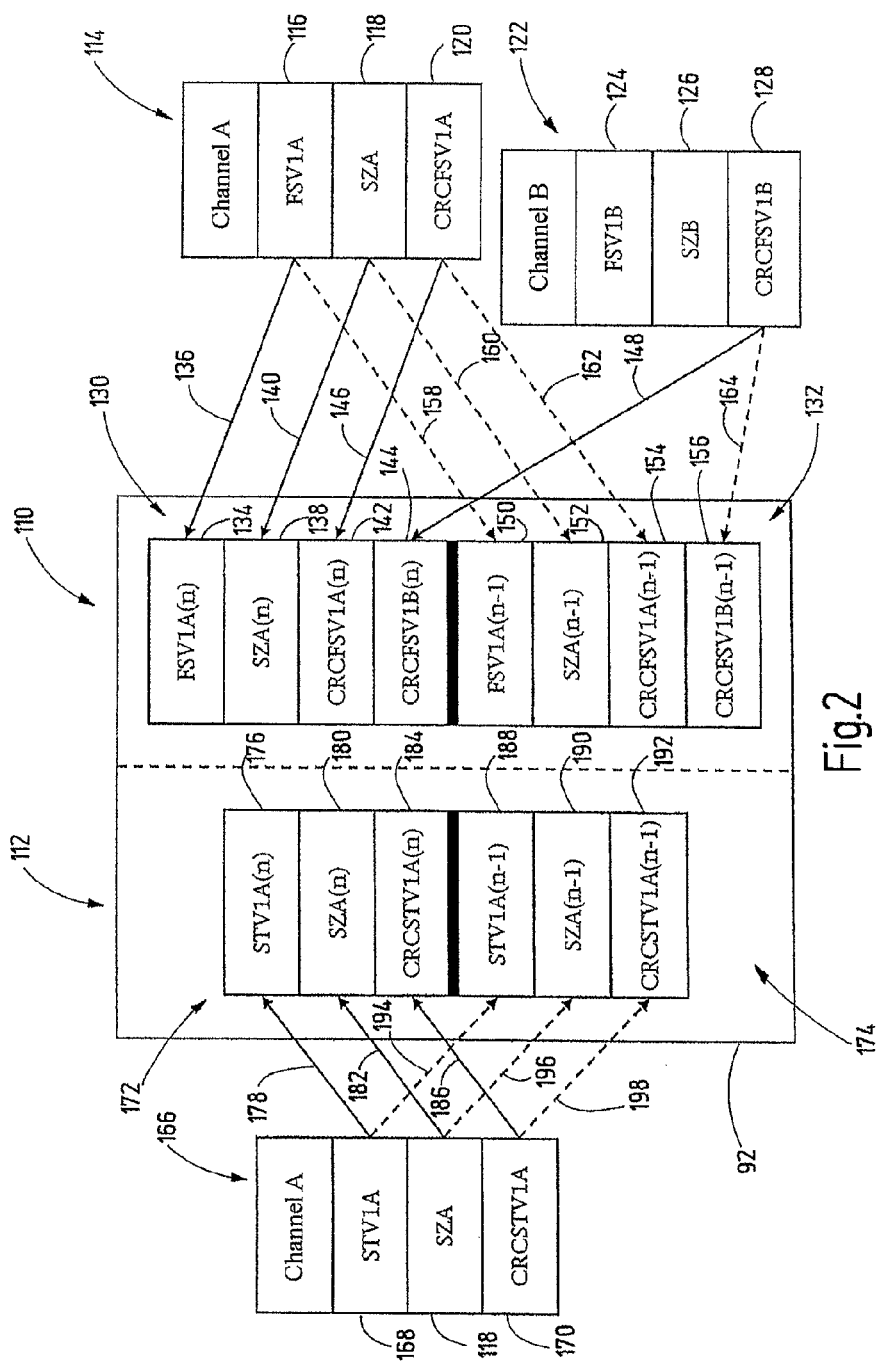
FIG. 2 shows a diagrammatic representation of a data memory for explaining the storage of data according to a first embodiment.

FIG. 2 shows the data memory 92 in which various values are stored in accordance with a first embodiment. The data memory 92 comprises a first storage subarea 110 which is provided for storing safety-related program variables. Furthermore, the data memory 92 comprises a second storage subarea 112 which is intended for storing non-safety-related program variables. This structure of the data memory 92 is not intended to have a restrictive effect. It is also feasible to provide two structurally independent data memories, one of which is provided for the safety-related program variables and the other one of which is provided for the non-safety-related program variables.

As already stated in conjunction with FIG. 1, the safety-related control unit 10 is constructed to be two-channel-redundant. Reference number 114 designates processing of a plurality of first safety-related program variables taking place in a first channel 88. One of the first safety-related program variables processed in the first channel 88 is the safety-related program variable FSV1A designated by the reference number 116. In this context, the nomenclature used has the following significance: FS stands for "failsafe" and thus indicates that this is a safety-related program variable. V1 is the actual name of the safety-related program variable considered, by means of which it can be identified in the plurality of first safety-related program variables which are processed by the first processor 20. The letter A indicates that this is a program variable processed in the first channel 88. This nomenclature is used uniformly for FIGS. 2 and 3.

Reference number 118 designates a write counter SZA used in the first channel 88. In this context, the value of the write counter SZA specifies the number of writing processes by means of which instantaneous values of the safety-related program variable FSV1A are written into the first storage subarea 110. Reference number 120 designates a test value determination CRCFSV1A performed in the first channel 88 for the safety-related program variable FSV1A. The letters CRC (cyclic redundancy check) indicate that the said test value determination takes place in accordance with a CRC process.

The reference number 122 designates processing, taking place in a second channel 90, of a plurality of second safety-related program variables. One of the second safety-related program variables processed in the second channel 90 is the safety-related program variable FSV1B designated by the reference number 124. The letter B indicates that this is a program variable processed in the second channel 90. The reference number 126 designates a write counter SZB used in the second channel 90. In this context, the value of the write counter SZB corresponds to the value of the write counter SZA. Reference number 128 designates a test value determination CRCFSV1B performed in the second channel 90 for the safety-related program variable FSV1B.

In this context, the safety-related program variable FSV1B corresponds to the safety-related program variable FSV1A. By this, the following is meant: as already stated in conjunction with FIG. 1, a first machine code 40 for the first channel 88 and a second machine code 42 for the second channel 90 are stored in the program memory 32 to provide for failsafe operation of the safety-related control unit 10, both machine codes 40, 42 in each case comprising an independent safety code 44, 48. With each of the two safety codes 44, 48, the same safety-related control input signals 72 of the safety-related sensors 74 are processed and safety-related control output signals 76 are determined for the same safety-related actuators 78. For this purpose, each of the two safety codes 44, 48 contains its own program variables, the first safety code 44 contains first safety-related program variables and the second safety code 48 contains second safety-related program variables. Although these are independent of one another in the sense that the first program variables and the second program variables occupy independent storage areas in the respective memories, the two safety codes 44, 48 contain program variables corresponding pair by pair. Thus, both the first safety code 44 and the second safety code 48 contains, for example, in each case a safety-related program input variable by means of which instantaneous values of the sensor signal generated by the same emergency-off button can be read in. This correspondingly applies to safety-related program output variables and possibly needed safety-related intermediate program variables.

In the first storage subarea 110, instantaneous values of the safety-related program variable FSV1A, values of the write counter SZA, and test values determined by means of the two test value determinations CRCFSV1A and CRCFSV1B are then stored as follows. The first storage subarea has two storage areas 130, 132. An instantaneous value FSV1A(n) of the first program variable FSV1A, present at a first defined instance of time, is stored in the first storage area 130 in a first storage cell 134 which is represented by an arrow 136. In this context, the nomenclature used has the following meaning: the appended expression (n) indicates that this is an instantaneous value. This instantaneous value is present at a first defined instance of time, this instance of time being located within the task cycle n. In this context, the task cycle is the period of time which is needed by the safety-related control unit 10 for running once through the application program beginning with the updating of the input image, the execution of the individual control instructions and ending with the provision of the output image. In consequence, it is sufficient, for example with a safety-related program input variable and a safety-related program output variable, to adjust to the task cycle as smallest unit of time since there is only one change per task cycle for these program variables. This results in the following meaning: the n designates a first defined instance of time and thus the task cycle in which this instance of time is located. The term (n−1) designates an older instance of time and thus one of the preceding task cycles. The term (n+1) designates a younger instance of time and thus one of the following task cycles.

The value SZA(n), present at the first defined instance of time, of the write counter SZA is also stored in the first storage area 130, namely in a second storage cell 138 which is represented by an arrow 140. Furthermore, a first test value CRCFSV1A(n), which is determined in dependence on the instantaneous value FSV1A(n) by the test value determination CRCFSV1A, and a second test value CRCFSV1B(n) are stored in the first storage area 130 in a third storage cell 142 and in a fourth storage cell 144 which is represented by arrows 146, 148.

The second test value CRCFSV1B(n) determined by means of the second test value determination CRCFSV1B then corresponds to the first test value CRCFSV1A(n). On the one hand, the second test value CRCFSV1B(n) is determined in dependence on an instantaneous value of the second program variable FSV1B which corresponds to the first program variable FSV1A. Furthermore, the instantaneous value of the second program variable FSV1B is present in the same task cycle as the instantaneous value FSV1A(n) of the first program variable FSV1A. The two test values CRCFSV1A(n) and CRCFSV1B(n) are preferably determined to be diversitary. For this purpose, the two test value determinations CRCFSV1A and CRCFSV1B are carried out to be diversitary in hardware technology and/or software.

In the second storage area 132, an instantaneous value FSV1A(n−1) of the first program variable FSV1A, a value SZA(n−1) of the write counter SZA, a first test value CRCFSV1A(n−1) and a second test value CRCFSV1B(n−1) are stored for an older instance of time, and thus a preceding task cycle, in a fifth storage cell 150, a sixth storage cell 152, a seventh storage cell 154 and an eighth storage cell 156 which is represented by arrows 158, 160, 162, 164. The individual values stored in the storage area 132 are determined correspondingly as is described for the corresponding values stored in the storage area 130.

The values stored in storage cells 134, 138, 142, 150, 152, 154 are determined by the first processor 20. The values stored in storage cells 144, 156 are determined by the second processor 22.

Both the instantaneous value of the first program variable FSV1A and the two test values determined by means of the test value determinations CRCFSV1A and CRCFSV1B are stored alternately in the two storage areas 130, 132. The two test values are thus determined and stored repeatedly for successive instances of time. For a younger instance of time, and thus a subsequent task cycle, the instantaneous value FSV1A(n+1) present at this instance of time and the two test values CRCFSV1A(n+1) and CRCFSV1B(n+1) are then stored in the corresponding storage cells 150, 152, 154, 156 of the storage area 132.

The data memory 92 has two storage areas 130, 132 which are allocated to the safety-related program variable FSV1A. If further safety-related program variables are stored in the data memory 92 in accordance with the procedure described above, it comprises also two storage areas for each of these program variables.

The first processor 20 can be designed for performing an instantaneous-value comparison. Using this instantaneous-value comparison, the instantaneous values, present at different instances of time, of the safety-related program variable FSV1A are compared with one another. If it is found by the instantaneous-value comparison that the two instantaneous values of two immediately successive instances of time do not differ, the storing of the younger instantaneous values and of the two younger test values can be omitted. In other words, the younger instantaneous value and the two younger instantaneous values are stored only if the younger instantaneous value differs from the instantaneous value present for the immediately preceding instance of time.

It is stated above that, for example, the first test value CRCFSV1A(n) is determined by the test value determination CRCFSV1A in dependence on the instantaneous value FSV1A(n). Correspondingly, for example, the second test value CRCFSV1B(n) is determined by the test value determination CRCFSV1B in dependence on the instantaneous value FSV1B(n). This can be understood to mean that the respective test value is determined for the instantaneous value of the associated safety-related program variable alone. As an alternative, the first test value CRCFSV1A(n) can also be determined for the combination which is obtained from the instantaneous value FSV1A(n) and the value SZA(n) of the write counter SZA. It is possible to proceed correspondingly for the second test value CRCFSV1B(n).

The storing of instantaneous values, write counter values and test values in the first storage subarea, described above, is based on the following consideration. As long as there is no voltage failure, for example, that is to say the safety-related control unit 10 operates faultlessly, the two safety-related program variables FSV1A and FSV1B comprise identical instantaneous values in the individual task cycles. In consequence, it is sufficient to store only the instantaneous values of the safety-related program variable FSV1A in the data memory 92. The two write counters SZA and SZB also comprise identical values within one task cycle.

By means of the two test values determined individually for the two channels 88, 90, it is now possible to check whether the instantaneous value FSV1A(n) stored last in the data memory 92 is valid or not. For this purpose, the first processor 20 is supplied with the instantaneous value FSV1A(n) and the first test value CRCFSV1A(n), for example in the case of a restart which is required after a voltage failure.

The second processor 22 is also supplied with the instantaneous value FSV1A(n), but with the second test value CRCFSV1B(n). If the safety-related control unit 10 has worked faultlessly within the time window in which the two test values CRCFSV1A(n) and CRCFSV1B(n) were determined and both the instantaneous value FSV1A(n) and these two test values were stored in the data memory 92, a repeated determination of a first current test value CRCFSV1A(n+1) and of a current second test value CRCFSV1B(n+1) will show that both the stored first test value CRCFSV1A(n) and the current first test value CRCFSV1A(n+1) are identical and also the stored second test value CRCFSV1B(n) and the current second test value CRCFSV1B(n+1) are identical. In this case, the stored instantaneous value FSV1A(n) is valid and can be used for initializing the safety-related control unit 10. Processing will take place in both channels 88, 90. If, in contrast, it is found that either the stored first test value CRCFSV1A(n) and the current first test value CRCFSV1A(n+1) are not identical or the stored second test value CRCFSV1B(n) and the current second test value CRCFSV1B(n+1) are not identical, the stored instantaneous value FSV1A(n) is not valid and can thus not be used for initializing the safety-related control unit 10. In this case, the previously stored instantaneous value FSV1A(n−1) is used instead for the initialization. This instantaneous value, before it is used for the initialization, is preferably firstly also subjected to a validity test. The safety-related control unit 10 and the installation 12 can thus be started again without the use of default values for the first safety-related program variable FSV1A or the performing of a reference run being required for this purpose.

In the validity test described above, it is first determined by means of the values SZA(n) and SZA(n−1) of the write counter SZA which one of the two instantaneous values which are stored in the first storage cell 134 and the fifth storage cell 150 is the younger. The younger instantaneous value is checked first during the validity check.

The data memory 92 has a second storage subarea 112 which is provided for storing non-safety-related program variables, the non-safety-related program variables being processed in the first channel 88.

Reference number 166 designates processing, taking place in a first channel 88, of a plurality of non-safety-related program variables. One of the first non-safety-related program variables processed in the first channel 88 is the safety-related program variable STV1A designated by the reference number 168. ST stands for "standard" in this case and thus indicates that this is a non-safety-related program variable. The significance of the designation V1 and of the letter A can be found in the statements relating to the processing designated by the reference number 114. Reference number 170 designates a test value determination CRCSTV1A, performed in the first channel 88, for the non-safety-related program variable STV1A.

In the second storage subarea 112, instantaneous values of the non-safety-related program variable STV1A, values of the write counter SZA, and test values determined with the test value determination CRCSTV1A are now stored as follows: the second storage subarea 112 has two storage areas 172, 174. An instantaneous value STV1A(n), present at a first defined instance of time, of the first non-safety-related program variable STV1A is stored in the third storage area 172 in a ninth storage cell 176 which is represented by an arrow 178. The value SZA(n) of the write counter SZA, present at the first defined instance of time, is also stored in a tenth storage cell 180 which is represented by an arrow 182. Furthermore, a test value CRCSTV1A(n) is stored which is determined by the test value determination CRCSTV1A in dependence on the instantaneous value STV1A(n), namely in an eleventh storage cell 184 which is represented by an arrow 186.

In the fourth storage area 174, an instantaneous value STV1A(n−1) of the non-safety-related program variable STV1A, a value SZA(n−1) of the write counter SZA and a test value CRCSTV1A(n−1) are stored for an older instance of time and thus a preceding task cycle in a twelfth storage cell 188, a thirteenth storage cell 190 and a fourteenth storage cell 192, which is represented by arrows 194, 196, 198. The individual values stored in the fourth storage area 174 are determined correspondingly as is described for the corresponding values stored in the third storage area 172. The values stored in storage cells 176, 180, 184, 188, 190, 192 are determined by the first processor 20.

Both the instantaneous value of the non-safety-related program variable STV1A and the test value determined by means of the test value determination CRCSTV1A are stored alternately in the two storage areas 172, 174. For a younger instance of time and thus a subsequent task cycle, the instantaneous value STV1A(n+1) present at this instance of time and the test value CRCSTV1A(n+1) are then stored in the corresponding storage cells 188, 190, 192 of the fourth storage area 174.

The data memory 92 has two storage areas 172, 174 which are allocated to the non-safety-related program variable STV1A. If further non-safety-related program variables are stored in the data memory 92 in accordance with the procedure described above, this memory also comprises two storage areas for each of these program variables.

Storing non-safety-related program variables can also take place by taking into consideration an instantaneous-value comparison. Similarly, the value of the write counter SZA can be taken into consideration during the determination of test values. The validity test of an instantaneous value STV1A(n) stored last takes place correspondingly as is described above for the safety-related program variables.

Correspondingly, it is also possible to check for the non-safety-related program variable STV1A whether the instantaneous value STV1A(n) stored last in the data memory 92 is valid or not.

For this purpose, the first processor 20 is supplied with the instantaneous value STV1A(n) and the test value CRCSTV1A(n), for example during a restart of the safety-related control unit 10. If the safety-related control unit 10 has operated faultlessly within the time window in which the test value CRCSTV1A(n) was determined and both the instantaneous value STV1A(n) and the test value CRCSTV1A(n) were stored in the data memory 92, a repeated determination of a current test value CRCSTV1A(n+1) will show that the stored test value CRCSTV1A(n) and the current test value CRCSTV1A(n+1) are identical. In this case, the stored instantaneous value STV1A(n) is valid and can be used for initializing the safety-related control unit 10. It will be processed in the first channel 88. If, in contrast, it is found that the stored test value CRCSTV1A(n) and the current test value CRCSTV1A(n+1) are not identical, the stored instantaneous value STV1A(n) is not valid and can thus not be used for initializing the safety-related control unit 10. In this case, the instantaneous value STV1A(n−1) previously stored is used instead for the initialization. This instantaneous value, before it is used for the initialization, is first preferably also subjected to a validity check. Thus, the safety-related control unit 10 and the installation 12 can be started again without the use of default values for the non-safety-related program variable STV1A or the performance of a reference run being required for this purpose.

In the validity check described above, it is first determined by means of the SZA(n) and SZA(n−1) values of the write counter SZA which one of the two instantaneous values which are stored in the ninth storage cell 176 and the twelfth storage cell 188 is the younger. The younger instantaneous value is tested first during the validity check.

The program variables processed with the first processor 20 are designated in summary as first program variables and the program variables processed with the second processor 22 are designated in summary as second program variables.

Figure 3:
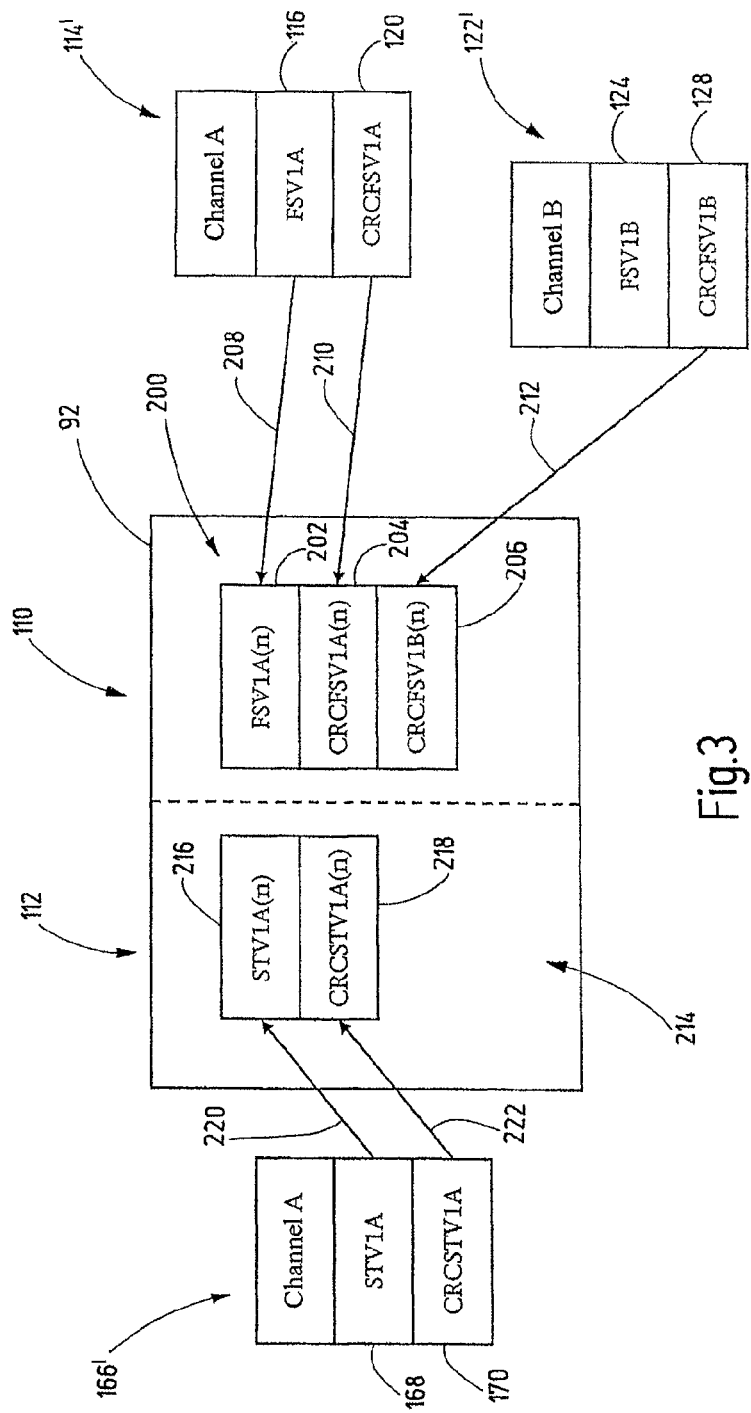
FIG. 3 shows a diagrammatic representation of a data memory for explaining the storage of data according to a second embodiment.

FIG. 3 shows the data memory 92 in which various values are stored in accordance with a second embodiment.

Reference number 114' designates processing taking place in the first channel 88 of a plurality of first safety-related program variables which differs from the processing 114 in that no write counter SZA is taken into consideration. Correspondingly, the reference number 122' designates processing, taking place in the second channel 90, of second safety-related program variables and reference number 166' designates processing, taking place in the first channel 88, of non-safety-related program variables.

In a fifth memory area 200, an instantaneous value FSV1A(n) of the first program variable FSV1A, a first test value CRCFSV1A(n) and a second test value CRCFSV1B(n) are stored in a fifteenth storage cell 202, a sixteenth storage cell 204 and a seventeenth storage cell 206 which is represented by arrows 208, 210, 212. In a sixth storage area 214, an instantaneous value STV1A(n) of a non-safety-related program variable STV1A and a test value CRCSTV1A(n) are stored in an eighteenth storage cell 216 and a nineteenth storage cell 218 which is represented by arrows 220, 222.

The values stored in the storage cells 202, 204, 216, 218 are determined by the first processor 20. The value stored in storage cell 206 is determined by the second processor 22. The individual stored values are determined in accordance with the statements relating to FIG. 2.

If further safety-related program variables are to be stored in the data memory 92, the latter has a correspondingly larger number of fifth storage areas 200. This correspondingly applies to the non-safety-related program variables and the sixth storage area 214. Similarly, the storing of the non-safety-related program variables and of the safety-related program variables can take place by taking into consideration an instantaneous-value comparison.

The validity check of the stored instantaneous values FSV1A(n) and STV1A(n) is carried out as is described in conjunction with FIG. 2. There is the following difference, however: if it is found that, for example, the instantaneous value FSV1A(n) is not valid, no further instantaneous value for the first safety-related program variable FSV1A, which could be used instead of the instantaneous value FSV1A(n), is stored in the data memory 92. In this case, the safety-related control unit 10 must be initialized either by means of a default value for the first safety-related program variable FSV1A or a reference run with the installation 12 must be performed. This correspondingly applies to the non-safety-related program variable STV1A.

Compared with the storage concept described with reference to FIG. 2, however, the storage concept described with reference to FIG. 3 has the advantage that the data memory 92 can be dimensioned to be smaller and is thus more cost effective.

What is claimed is:

1. A safety-related control unit for controlling an automated installation in accordance with an application program executed on the control unit, the installation comprising a plurality of sensors and a plurality of actuators, and the application program comprising a plurality of control instructions for controlling the actuators, the safety-related control unit comprising:
    a first processor for executing at least some of the control instructions by processing a plurality of first program variables, the first processor also determining a first test value for at least one of the first program variables in accordance with an instantaneous value present for said at least one of the first program variables at a first defined instance of time,
    a second processor for executing at least some of the control instructions by processing a plurality of second program variables, the second processor further determining a second test value for the at least one of the first program variables, said second test value corresponding to the first test value, and
    a data memory designed for storing the instantaneous value, the first test value and the second test value;
    wherein the safety-related control unit is configured to perform a validity check of the instantaneous value at any restart by using the first processor and the second processor, wherein the first processor performs the validity check of the instantaneous value using the first test value, and wherein the second processor performs the validity check of the instantaneous value using the second test value.

2. The safety-related control unit of claim 1, wherein the second processor further determines the second test value in accordance with an instantaneous value of one of the second program variables, the second program variable corresponding to the first program variable.

3. The safety-related control unit of claim 2, wherein the instantaneous value of the first program variable and the instantaneous value of the second program variable originate from a common task cycle.

4. The safety-related control unit of claim 1, wherein the safety-related control unit determines the first and second test values with different algorithms.

5. The safety-related control unit of claim 1, wherein the data memory comprises a non-volatile data memory.

6. The safety-related control unit of claim 1, wherein the safety-related control unit repeatedly determines the first and second test values for successive instances of time.

7. The safety-related control unit of claim 1, wherein the first processor further performs an instantaneous-value comparison.

8. The safety-related control unit of claim 1, wherein the data memory comprises two storage areas allocated to the first program variable.

9. The safety-related control unit of claim 8, wherein the safety-related control unit alternately stores the instantaneous value and the first and second test values into the two storage areas.

10. The safety-related control unit of claim 1, wherein at least one of the first and second processors determines a value for a write counter.

11. The safety-related control unit of claim 10, wherein the first processor determines the first test value in accordance with the instantaneous value and the value of the write counter.

12. The safety-related control unit of claim 1, wherein both of the first and the second program variables are safety-related program variables.

13. A method for controlling an automated installation, the installation comprising a plurality of sensors and a plurality of actuators, the method comprising the steps of:
    processing a plurality of first program variables using a first processor,
    determining a first test value for at least one of the first program variables in accordance with an instantaneous value present for said at least one of the first program variables at a first defined instance of time,
    processing a plurality of second program variables using a second processor,
    determining a second test value for the at least one of the first program variables, said second test value corresponding to the first test value, and
    storing the instantaneous value, the first test value and the second test value in a data memory to provide the instantaneous value for a start up, and further to check a validity of the instantaneous value at the start up using the first and second test values.

* * * * *